United States Patent
Salla et al.

(10) Patent No.: US 9,784,079 B2
(45) Date of Patent: Oct. 10, 2017

(54) FUNCTIONALIZED NANOPARTICLES AS CROSSLINKING AGENTS FOR SEALANT APPLICATION

(71) Applicant: Halliburton Energy Services, Inc., Houston, TX (US)

(72) Inventors: Rajender Salla, Maharashtra (IN); Vilas Ramtenki, Maharashtra (IN); Shoy George Chittattukara, Kerala (IN); Neelam Deepak Raysoni, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/753,331

(22) Filed: Jun. 29, 2015

(65) Prior Publication Data
US 2016/0376490 A1    Dec. 29, 2016

(51) Int. Cl.
| | |
|---|---|
| *E21B 43/16* | (2006.01) |
| *C09K 8/512* | (2006.01) |
| *C08K 9/06* | (2006.01) |
| *C09K 8/508* | (2006.01) |
| *C09K 8/516* | (2006.01) |

(52) U.S. Cl.
CPC .............. *E21B 43/16* (2013.01); *C08K 9/06* (2013.01); *C09K 8/508* (2013.01); *C09K 8/512* (2013.01); *C09K 8/516* (2013.01); *C09K 2208/10* (2013.01)

(58) Field of Classification Search
None
See application file for complete search history.

(56) References Cited

U.S. PATENT DOCUMENTS

| | | | |
|---|---|---|---|
| 6,196,317 B1 * | 3/2001 | Hardy | C09K 8/512 166/270 |
| 6,283,210 B1 | 9/2001 | Yousef et al. | |
| 7,086,466 B2 | 8/2006 | Roddy | |
| 7,091,159 B2 | 8/2006 | Eoff et al. | |
| 7,114,568 B2 | 10/2006 | Eoff et al. | |
| 7,559,369 B2 * | 7/2009 | Roddy | C04B 20/008 106/717 |
| 7,784,542 B2 | 8/2010 | Roddy et al. | |
| 7,806,183 B2 | 10/2010 | Roddy et al. | |
| 7,892,352 B2 | 2/2011 | Roddy et al. | |
| 8,183,186 B2 | 5/2012 | Luo et al. | |
| 8,476,203 B2 | 7/2013 | Patil et al. | |
| 8,518,208 B2 | 8/2013 | Kohli et al. | |

(Continued)

OTHER PUBLICATIONS

Ukaji et al.; Curing of Epoxy Resin by Hyperbranched Poly(amidoamine)-grafted Silica Nanoparticles and Their Properties; 2008; The Society of Polymer Science; pp. 607-613.*

(Continued)

*Primary Examiner* — Angela M DiTrani
*Assistant Examiner* — Anuradha Ahuja
(74) *Attorney, Agent, or Firm* — Craig W. Roddy; Tumey L.L.P.

(57) ABSTRACT

A method may comprise reacting components comprising functionalized silica nanoparticles and a crosslinkable component in a subterranean formation to create a barrier in the subterranean formation, wherein the functionalized silica nanoparticles comprise at least one functional group selected from the group consisting of amino groups, thiol groups, and combinations thereof.

11 Claims, 6 Drawing Sheets

(56) References Cited

U.S. PATENT DOCUMENTS

| | | | |
|---|---|---|---|
| 8,586,512 B2 | 11/2013 | Roddy et al. | |
| 8,685,903 B2 | 4/2014 | Ravi et al. | |
| 2005/0187113 A1* | 8/2005 | Hayes | C09K 8/03 507/119 |
| 2005/0196343 A1* | 9/2005 | Reddy | A61K 31/7072 424/9.322 |
| 2006/0166834 A1 | 7/2006 | Roddy et al. | |
| 2008/0006413 A1* | 1/2008 | Le Gloahec | E21B 43/084 166/369 |
| 2008/0160289 A1 | 7/2008 | Lin et al. | |
| 2008/0223578 A1* | 9/2008 | Berkland | C09K 8/512 166/300 |
| 2009/0079006 A1 | 3/2009 | Tanaka et al. | |
| 2009/0312201 A1* | 12/2009 | Huang | C09K 8/516 507/265 |
| 2010/0016183 A1 | 1/2010 | Roddy et al. | |
| 2011/0073303 A1* | 3/2011 | Taherian | E21B 17/028 166/254.2 |
| 2012/0015852 A1* | 1/2012 | Quintero | C09K 8/032 507/112 |
| 2013/0005856 A1 | 1/2013 | Phonthammachai et al. | |

OTHER PUBLICATIONS

Buchman, et al., "Silica Nanoparticles and Polyethyleneimine (PEI)-Mediated Functionalization: A New Method of PEI Covalent Attachment for siRNA Delivery Applications," Bioconjugate Chem. 2013, vol. 24, pp. 2076-2087.

Ukaji, et al. "Curing of Epoxy Resin by Hyperbrached Poly(amidoamine)-grafted Silica Nanoparticles and Their Properties," Polymer Journal, 2008, vol. 40, No. 7, pp. 607-613, Japan.

Lin, et al., "Mesoporous Silica Nanoparticles with Controlled Loading of Cationic Dendrimer for Gene Delivery," Materials Research Express 1 (2014), 035403.

Deolarte, et al., "Successful Combination of an Organically Cross-linked Polymer System and a Rigid-Setting Material for Conformance Control in Mexico," SPE International, 2008, 112411.

HZ-10™ Polymer, Halliburton Data Sheet, Oct. 2007.

Karunakaran, et al., Highly Transparent Superhydrophobic Surfaces from the Coassembly of Nanoparticles (≤ 100nm), Langmuir, 2011, vol. 27, pp. 4594-4602.

Tsubokawa, et al., "Grafting of dendrimer-like highly branched polymer onto ultrafine silica surface," Reactive & Functional Polymers, 1998, vol. 37, pp. 75-82.

* cited by examiner

FUNCTIONALIZED NANOPARTICLES AS CROSSLINKING AGENTS FOR SEALANT APPLICATION

BACKGROUND

The present disclosure relates to treatment of subterranean formations and, in specific examples, to sealant compositions that may be used for creating fluid flow preventing barriers in a subterranean formation.

When hydrocarbons are produced from wells that penetrate hydrocarbon producing formations, water often accompanies the hydrocarbons, particularly as the wells mature in time. The water can be the result of a water-bearing zone communicated with the hydrocarbon producing formations or zones by fractures, high permeability streaks and the like, or the water can be caused by a variety of other occurrences which are well known to those skilled in the art, such as water coning, water cresting, bottom water, channeling at the wellbore, etc. As used herein, the term "zone" simply refers to a portion of the formation and does not imply a particular geological strata or composition. Over the life of such wells, the ratio of water to hydrocarbons recovered may be undesirable in view of the cost of producing the water, separating it from the hydrocarbons, and disposing it, which can represent a significant economic loss.

A variety of techniques have been used to reduce the production of undesired water. Generally, these techniques involve the placement of a material in a wellbore penetrating a water-zone portion of a subterranean formation that may prevent or control the flow of water into the wellbore. The techniques used to place these materials are referred to herein as "conformance techniques" or "conformance treatments." Some techniques involve the injection of particulates, foams, gels, sealants, resin systems, or blocking polymers (e.g., crosslinked polymer compositions) into the subterranean formation so as to plug off the water-bearing zones. At elevated temperatures crosslinked polymer compositions or cured resin systems may undergo cracking and deterioration, causing a reduction in mechanical strength limiting their effectiveness for controlling water flow. High temperature wells may be more likely to encounter this problem, in turn leading to potentially expensive well work overs, remedial treatments, and negative impact on well production and life.

BRIEF DESCRIPTION OF THE DRAWINGS

These drawings illustrate certain aspects of some of the embodiments of the present invention, and should not be used to limit or define the invention.

DETAILED DESCRIPTION

Provided herein are sealant compositions that may comprise functionalized silica nanoparticles. The functionalized silica nanoparticles may comprise silica nanoparticles having at least one amino group or thiol group coupled to the silica nanoparticle. The functionalized silica nanoparticles may be used as crosslinking agents in the sealant compositions. The sealant compositions may be used to form a fluid flow preventing barrier in a subterranean formation. Advantageously, the fluid flow preventing barrier may have a high thermal stability and durability even at higher temperatures and drastic environmental changes, as compared to existing crosslinked polymer compositions which do not use functionalized silica nanoparticles thus limiting their use at high temperatures. Accordingly, the functionalized silica nanoparticles may be particularly suited for use in high temperature wells. Additionally, the preparation of the functionalized silica nanoparticles may be simple, accessible and inexpensive.

Any of a variety of different techniques may be used for functionalizing the silica nanoparticles with amine or thiol groups. Functionalizing the silica nanoparticles may comprise coupling amino or thiol groups to the silica nanoparticles. Polyamino or polythiol groups may be coupled to the silica nanoparticles in some examples. In one example, the silica nanoparticles may be functionalized by reaction with an amine. By way of example, the silica nanoparticles may be functionalized by a condensation reaction in which hydroxyl groups on the surface of the silica nanoparticle react with an amine-containing molecule that has an easily condensable group. Advantageously, the amine may be available for subsequent crosslinking as a result of the condensation reaction. The amine may be aromatic, aliphatic, or a combination thereof. The amine may be a primary, second, tertiary, or cyclic amine. The amine may contain one or more alkyl or aryl substituents. For aryl substituents or aromatic rings, the aryl group may include a single aromatic ring or multiple aromatic rings, which may or may not include heteroatoms (e.g., S, N, O). Alternatively, an alkyl chain or aromatic ring may contain one or more amine substituents. For aliphatic amines, they may be short chain amines, in some examples. As used herein, the term "short chain" means less than or equal to 9 carbons in length. While the preceding describes different amines that may be reacted with the silica nano-particles, it should be appreciates that the present disclosure also encompasses the use of thiols or thiol-containing molecules in the preparation of the functionalized silica nano-particles. Those of ordinary skill in the art, with the benefit of this disclosure, should recognize that a wide variety of amines and thiols, as well as amine- and thiol-containing molecules, may be suitable to functionalize the silica nanoparticles.

Figure 1:
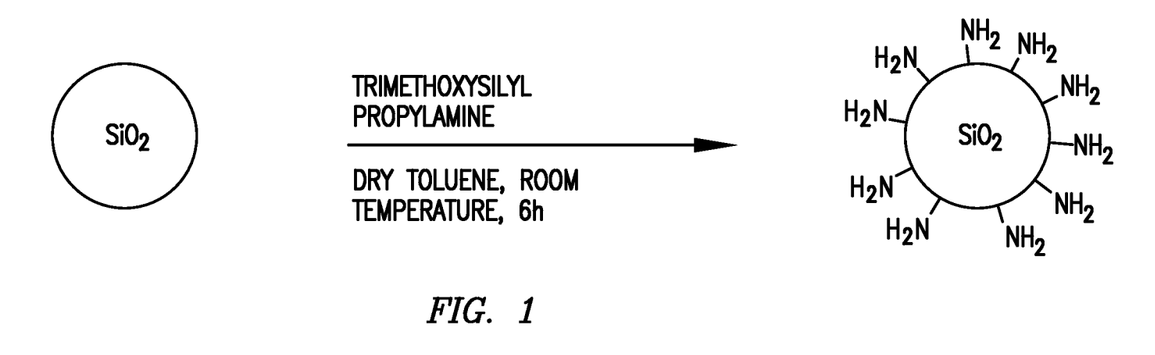
FIG. 1 is a schematic illustration of an example reaction scheme for producing functionalized silica nanoparticles.

An example technique for preparation of functionalized silica nanoparticles by reaction of silica nanoparticles with trimethoxysilyl propyl amine is shown in FIG. 1. The silica nanoparticles may be present in a suitable solvent, such as toluene, benzene, xylene, or other hydrophobic solvent.

Figure 2:
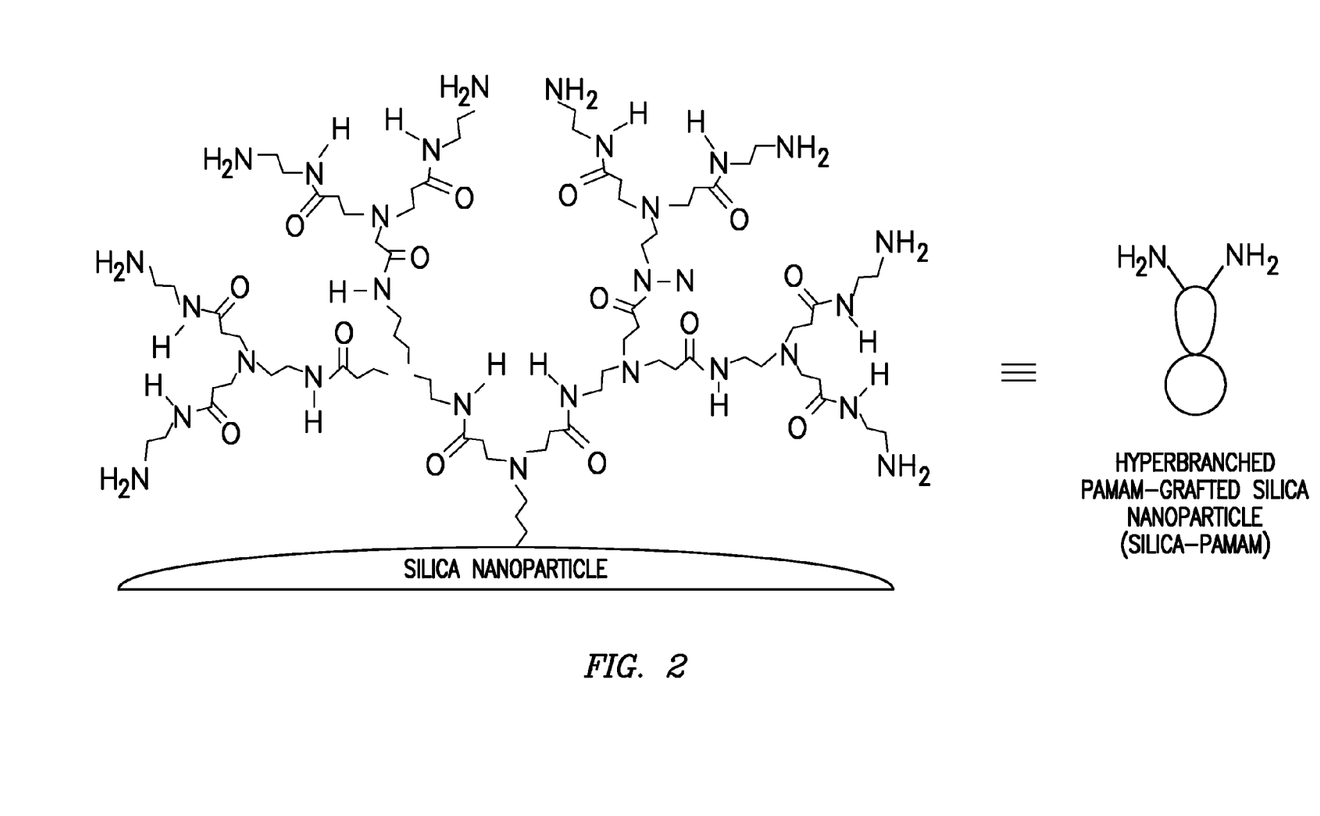
FIG. 2 is a schematic illustration of an example functionalized silica nanoparticle.

Suitable functionalized silica nanoparticle may also comprise silica nanoparticles grafted with hyperbranched polyamines. By way of example, silica nanoparticles may be grafted with hyperbranched poly(amidoamine) polymers. An example hyperbranched poly(amidoamine) functionalized silica nanoparticle is shown in FIG. 2.

A suitable amount of the amine may be reacted with the silica nanoparticle to provide the desired level of functionalization. Each of the silica nanoparticles may contain a plurality of amine functionalities and may contain a high number of amine functionalities, in some examples, for example, at least about 50 functionalities or greater, at least 100 functionalities or greater, at least about 200 functionalities or greater, or at least about 500 functionalities or greater. In specific examples, the amount of amine functionalities may range from about 50 to about 1,000, about 100 to about 1,000, about 200 to about 700, about 200 to about 400, or about 500 to about 700.

The silica nanoparticles may include a plurality of discrete nanoparticles of oxide of silicon having the formula $SiO_2$, without regard to shape, morphology, porosity, and water content. Generally, the silica nanoparticles may have a particle size of about 100 nanometers ("nm") or less. Alternatively, the silica nanoparticles may have a particle size of about 90 nm, about 80 nm, about 70 nm, about 60 nm, about 50 nm, about 40 nm, or less. In specific examples, the mean particle size of the silica nanoparticles may range from about 1 nm to about 100 nm, about 50 nm to about 100 nm, about 1 nm to about 50 nm, about 5 nm to about 50 nm, about 10 nm to about 50 nm, about 20 nm to about 50 nm, or about 30 nm to about 50 nm.

As used herein, the term "particle size" refers to volume surface mean diameter ("$D_S$") which is related to the specific surface area. Volume surface mean diameter may be defined by the following formula: $D_S=6/(\Phi_S A_w \rho_p)$ where $\Phi_S$=sphericity; $A_w$=Specific surface area and $\rho_p$=Particle density. It should be understood that the particle size of the silica nanoparticles may vary based on the measurement technique, sample preparation, and sample conditions (e.g., temperature, concentration, etc.). One technique for measuring particle size of the silica nan-particles at room temperature (approx. 80° F.) includes dispersing the silica nanoparticles in a suitable solvent (such as chloroform, dichloroethane, acetone, methanol, ethanol, water, etc.) by sonification and proper dilution. A dispersing agent may be used to deagglomerate the silica nanoparticles, if needed. The diluted, dispersed solution may then be placed on a carbon-coated copper grid with 300 mesh size by using a micropipette. It may then be dried and examined by Transmission electron microscopy (TEM). The particle size distribution may be obtained with high accuracy using an appropriate computation technique. By way of example, TEM image processing may use image-processing software such as Image-Pro® Plus software from Media Cybernetics to determine the particle size. Another example technique involves use of calibrated drawing tools in Digital Micrograph software followed by statistical analysis of the data with Kaleida-Graph software to determine the particle size.

The functionalized silica nanoparticles may be used as a crosslinking agent for various crosslinkable polymers to create a fluid flow preventing barrier in a subterranean formation. The functionalized silica nanoparticles may be included in the sealant compositions in an amount suitable to provide a desirable degree of crosslinking. More specifically, the functionalized silica nanoparticles may be used, without limitation, in the sealant compositions in an amount of from about 0.1% to about 20%, from about 0.1% to about 10%, or from about 0.1% to about 5% by weight of the sealant composition.

The crosslinkable component may include a variety of crosslinkable components, such as water-soluble polymers and polymerizable resins that contain groups that are reactive with the amino or thiol groups on the functionalized silica nanoparticles to form crosslinks. An example of a suitable water-soluble polymer may include a copolymer of a non-acidic ethylenically unsaturated polar monomer and a copolymerizable ethylenically unsaturated ester. The copolymer may contain from one to three polar monomers and from one to three unsaturated esters. Another example of a suitable water-soluble polymer may include a terpolymer or tetrapolymer of an ethylenically unsaturated polar monomer, an ethylenically unsaturated ester, and a monomer selected from 2-acrylamido-2-methylpropane sulfonic acid, N-vinylpyrrolidone, or both. In addition to the functionalized silica nanoparticles, the sealant composition may also include an additional crosslinking agent for the crosslinkable polymer. The additional crosslinking agent may be, for example, an organic crosslinking agent such as a polyalkyleneimine, a polyfunctional aliphatic amine such as polyalkylenepolyamine, an aralkylamine, a heteroaralkylamine, or combinations thereof. Examples of suitable polyalkyleneimines are polymerized ethyleneimine and propyleneimine. Examples of suitable polyalkylenepolyamines are polyethylene- and polypropylene-polyamines. The water-soluble polymer may be present in any suitable amount including, without limitation, a range of from about 1% to about 10% by weight of the sealant composition. Where used, the additional crosslinking agent may be present in an amount in a range of from about 0.1% to about 5% by weight of the sealant composition. One of ordinary skill in the art with the benefit of this disclosure should be to select an appropriate type and amount of a water-soluble polymer and/or additional crosslinking agent for a particular application. A water-soluble polymer may comprise a copolymer of acrylamide and t-butyl acrylate, and an additional crosslinking agent may polyethylene imine.

Suitable ethylenically unsaturated esters used in the crosslinkable material may be foamed from a hydroxyl compound and an ethylenically unsaturated carboxylic acid selected from the group consisting of acrylic, methacrylic, crotonic, and cinnamic acids. The ethylenically unsaturated group may be in the alpha-beta or beta-gamma position relative to the carboxyl group, but it may be at a further distance. The hydroxyl compound may be an alcohol generally represented by the formula ROH, wherein R is an alkyl, alkenyl, cycloalkyl, aryl, arylalkyl, aromatic, or heterocyclic group that may be substituted with one or more of a hydroxyl, ether, or thioether group. The substituent can be on the same carbon atom of the R group as is bonded to the hydroxyl group in the hydroxyl compound. The hydroxyl compound may be a primary, secondary, iso, or tertiary compound. The tertiary carbon atom may be bonded to the hydroxyl group, e.g., t-butyl and trityl. The ethylenically unsaturated ester may be t-butyl acrylate.

Suitable non-acidic ethylenically unsaturated polar monomers used in the crosslinkable material may be amides, e.g., primary, secondary, and/or tertiary amides, of an unsaturated carboxylic acid. Such amides may be derived from ammonia, or a primary or secondary alkylamine, which may be optionally substituted by at least one hydroxyl group as in alkylol amides such as ethanolamines. Examples of such carboxylic derived ethylenically unsaturated polar monomers are acrylamide, methacrylamide, and acrylic ethanol amide Examples of suitable polymerizable resins that may be used include, but are not limited to, epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, bisphenol A diglycidyl ether resins, butoxymethyl butyl glycidyl ether resins, bisphenol A-epichlorohydrin resins, bisphenol F resins, glycidyl ether resins, polyester resins and hybrids and copolymers thereof, polyurethane resins and hybrids and copolymers thereof, acrylate resins, and mixtures thereof. The functionalized silica nanoparticles may function as a hardening agent by crosslinking the polymer chains of the polymerizable resin.

A solvent may be used with the resin to reduce its viscosity for ease of handling, mixing and transferring. However, it may be desirable not to use such a solvent for environmental or safety reasons. It is within the ability of one skilled in the art with the benefit of this disclosure to determine if and how much solvent may be needed to achieve a viscosity suitable to the subterranean conditions of a particular application. Factors that may affect this decision include geographic location of the well, the surrounding weather conditions, and the desired long-term stability of the resin-based seal ant composition.

Generally, any solvent that is compatible with the polymerizable resin and that achieves the desired viscosity effect may be suitable for use with the polymerizable resin. Suitable solvents may include, but are not limited to, polyethylene glycol, butyl lactate, dipropylene glycol methyl ether, dipropylene glycol dimethyl ether, dimethyl formamide, diethylene glycol methyl ether, ethyleneglycol butyl ether, diethyleneglycol butyl ether, propylene carbonate, d'limonene, fatty acid methyl esters, and combinations thereof. Selection of an appropriate solvent may be dependent on the polymerizable resin chosen. With the benefit of this disclosure, the selection of an appropriate solvent should be within the ability of one skilled in the art.

Generally, the polymerizable resin may be included in the sealant composition in an amount suitable for a particular application, including without limitation in an amount in a range from about 1% to about 90% by weight of the sealant composition. By way of example, the polymerizable resin may be present in an amount of about 1%, about 10%, about 20%, about 30%, about 40%, about 50%, about 60%, about 70%, about 80%, or about 90% by weight of the sealant composition. One of ordinary skill in the art with the benefit of this disclosure should be to select an appropriate type and amount of a polymerizable resin for a particular application.

The sealant composition optionally may comprise an aqueous base fluid. Suitable aqueous base fluids may comprise, without limitation, freshwater, saltwater, brine, seawater, or any other suitable aqueous fluids that preferably do not undesirably interact with the other components used in the sealant composition. The amount of water included in the sealant composition may range, without limitation, from about 25% to about 75% by weight of the sealant composition.

The sealant compositions optionally may comprise any number of additional additives, including, but not limited to, salts, surfactants, acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, particulate materials (e.g., proppant particulates), wetting agents, coating enhancement agents, and the like. A person skilled in the art, with the benefit of this disclosure, should recognize the types of additives that may be included in the sealant compositions for a particular application.

The fluid flow preventing barrier may be formed in the subterranean formation to block certain flow paths in the subterranean formation, reducing the flow of fluids through the subterranean formation, especially the flow of aqueous fluids. Examples of the types of flow paths that may be blocked by the fluid flow preventing barrier include, but are not limited to, perforations, such as those formed by a perforation gun, fissures, cracks, fractures, streaks, flow channels, voids, high permeable streaks, annular voids, or combinations thereof, as well as any other zone in the formation through which fluids may undesirably flow.

As will be appreciated by those of ordinary skill in the art, the sealant composition may be used in a variety of subterranean operations, where formation of a fluid diverting (or flow preventing) barrier may be desired, such as conformance treatments and lost circulation control, among others. The sealant composition may be used prior to, during, or subsequent to a variety of subterranean operations. Methods of using the sealant compositions may first include preparing the sealant compositions. The sealant compositions may be prepared in any suitable manner, for example, by combining the functionalized silica nanoparticles, crosslinkable component, and any of the additional components described herein in any suitable order. The sealant composition may be used as a single step treatment in which the functionalized silica nanoparticles and crosslinkable component are mixed with the aqueous base fluid and then introduced into the subterranean formation for crosslinking. It may be desired to form the sealant composition immediately prior to use to prevent premature crosslinking before reaching the desired location in the subterranean formation. Alternatively, the sealant composition may be used as a multi-step treatment in which the functionalized silica nanoparticles and the crosslinkable component may be separately introduced into the subterranean formation for crosslinking. For example, the crosslinkable component may be placed into the subterranean formation where it may be contacted with functionalized silica nanoparticles, which may already be present in the formation or subsequently introduced.

Methods may include introduction of the sealant composition into a subterranean formation. In the subterranean formation, the sealant composition may undergo a crosslinking reaction to flow preventing barrier that blocks certain flow paths therein, reducing the flow of fluids through the subterranean formation, especially the flow of aqueous fluids. Examples of the types of flow paths that may be blocked by the gel network include, but are not limited to, perforations, such as those formed by a perforation gun, fissures, cracks, fractures, streaks, flow channels, voids, high permeable streaks, annular voids, or combinations thereof, as well as any other zone in the formation through which fluids may undesirably flow. Methods may further include selecting one or more zones of the subterranean formation for conformance control in which the sealant composition may be introduced.

A method may comprise reacting components comprising functionalized silica nanoparticles and a crosslinkable component in a subterranean formation to create a barrier in the subterranean formation. The functionalized silica nanoparticles may comprise at least one functional group selected from the group consisting of amino groups, thiol groups, and combinations thereof. The barrier may be used to block flow paths for conformance control. A sealant composition comprising the functionalized silica nanoparticles and the crosslinkable component may be introduced into the subterranean formation. The sealant composition may be pumped from a fluid supply and into a wellbore via a wellbore supply conduit fluidically coupled to the wellbore, the wellbore penetrating the subterranean formation. The functionalized silica nanoparticles may be present in the sealant composition in an amount of from about 0.1% to about 10% by weight. At least a portion of the functionalized silica nanoparticles each may comprise the amino groups coupled to a silica nanoparticle, the silica nanoparticle may have a particle size of about 100 nanometers or less. The functionalized silica nanoparticles each may comprise a silica nanoparticle grafted with a hyperbranched polyamine. At least a portion of the functionalized silica nanoparticles each may comprise from about 200 to about 700 amine functionalities. The crosslinkable component may comprise a water-soluble polymer. The crosslinkable component may comprise at least one water-soluble polymer selected from the group consisting of a copolymer of a non-acidic ethylenically unsaturated polar monomer and a copolymerizable ethylenically unsaturated ester; a terpolymer or tetrapolymer of an ethylenically unsaturated polar monomer, an ethylenically unsaturated ester, and a monomer selected from 2-acrylamido-2-methylpropane sulfonic acid, N-vinylpyrrolidone, or both; and combinations thereof. The water-soluble polymer may comprise a copolymer of acrylamide and t-butyl acrylate. The crosslinkable component may comprise a resin. The functionalized silica nanoparticles may be used in combination with one or more additional crosslinking agents for crosslinking of the crosslinkable component.

A sealant composition may comprise a crosslinkable component; and functionalized silica nanoparticles for crosslinking the crosslinkable component. The functionalized silica nanoparticles may comprise at least one functional group selected from the group consisting of amino groups, thiol groups, and combinations thereof. The functionalized silica nanoparticles may be present in the sealant composition in an amount of from about 0.1% to about 10% by weight. At least a portion of the functionalized silica nanoparticles each may comprise the amino groups coupled to a silica nanoparticle, the silica nanoparticle may have a particle size of about 100 nanometers or less. The functionalized silica nanoparticles each may comprise a silica nanoparticle grafted with a hyperbranched polyamine. At least a portion of the functionalized silica nanoparticles each may comprise from about 200 to about 700 amine functionalities. The crosslinkable component may comprise at least one water-soluble polymer selected from the group consisting of: a copolymer of a non-acidic ethylenically unsaturated polar monomer and a copolymerizable ethylenically unsaturated ester; a terpolymer or tetrapolymer of an ethylenically unsaturated polar monomer, an ethylenically unsaturated ester, and a monomer selected from 2-acrylamido-2-methylpropane sulfonic acid, N-vinylpyrrolidone, or both; and combinations thereof. The water-soluble polymer may comprise a copolymer of acrylamide and t-butyl acrylate. The crosslinkable component may comprise a resin. The sealant composition may further comprise one or more additional crosslinking agents for crosslinking of the crosslinkable component.

A well system may comprise a sealant composition, a fluid handling system, and a conduit. The sealant composition may comprise a crosslinkable component and functionalized silica nanoparticles for crosslinking the crosslinkable component. The functionalized silica nanoparticles may comprise at least one functional group selected from the group consisting of amino groups, thiol groups, and combinations thereof. The fluid handling system may comprise the sealant composition. The conduit may be fluidically coupled to the fluid handling system and a wellbore. The fluid handling system may comprise a fluid supply and pumping equipment. The functionalized silica nanoparticles may be present in the sealant composition in an amount of from about 0.1% to about 10% by weight. At least a portion of the functionalized silica nanoparticles each may comprise the amino groups coupled to a silica nanoparticle, the silica nanoparticle may have a particle size of about 100 nanometers or less. The functionalized silica nanoparticles each may comprise a silica nanoparticle grafted with a hyperbranched polyamine. At least a portion of the functionalized silica nanoparticles each may comprise from about 200 to about 700 amine functionalities. The crosslinkable component may comprise at least one water-soluble polymer selected from the group consisting of: a copolymer of a non-acidic ethylenically unsaturated polar monomer and a copolymerizable ethylenically unsaturated ester; a terpolymer or tetrapolymer of an ethylenically unsaturated polar monomer, an ethylenically unsaturated ester, and a monomer selected from 2-acrylamido-2-methylpropane sulfonic acid, N-vinylpyrrolidone, or both; and combinations thereof. The water-soluble polymer may comprise a copolymer of acrylamide and t-butyl acrylate. The crosslinkable component may comprise a resin. The sealant composition may further comprise one or more additional crosslinking agents for crosslinking of the crosslinkable component.

Figure 3:
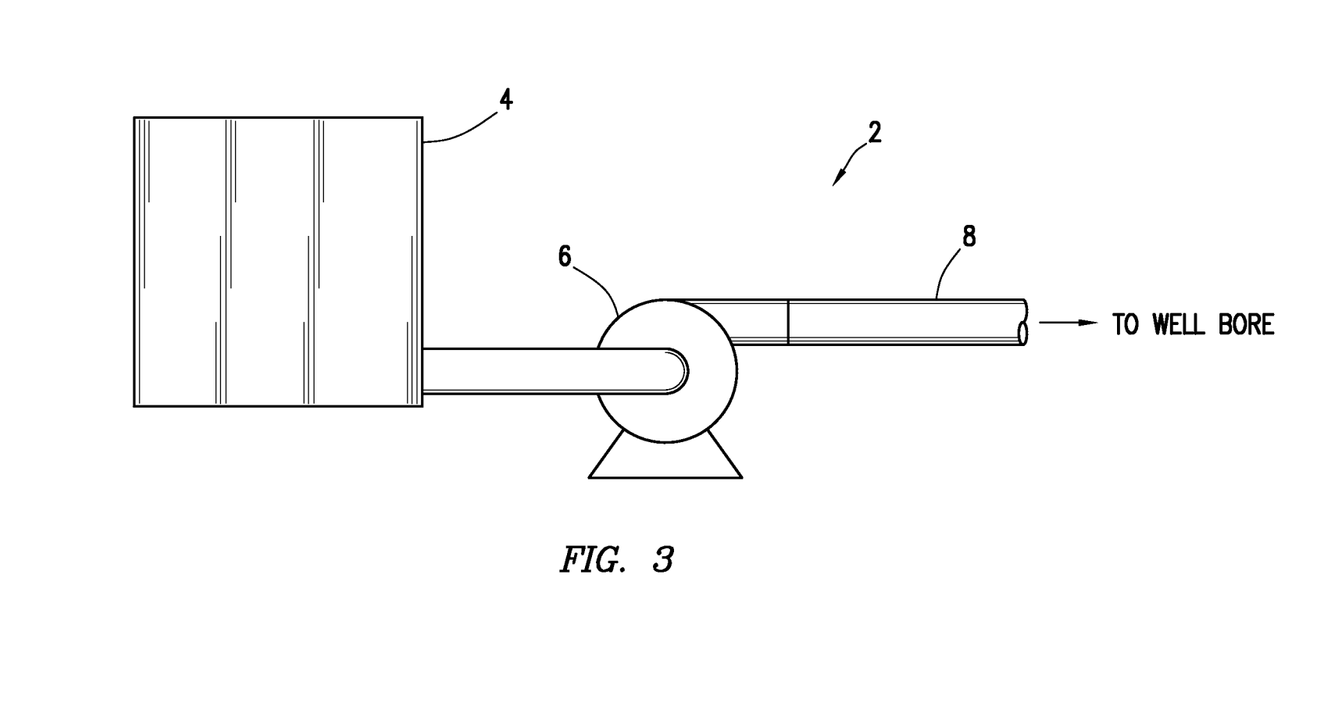
FIG. 3 is a schematic illustration of an example fluid handling system for the preparation and delivery of a sealant composition into a wellbore.

Example methods of using the sealant compositions will now be described in more detail with reference to FIGS. 3 and 4. Any of the previous embodiments of the sealant composition may apply in the context of FIGS. 3 and 4. Referring now to FIG. 3, a fluid handling system 2 is illustrated. The fluid handling system 2 may be used for preparing the sealant composition and introduction of the sealant composition into a wellbore. The fluid handling system 2 may include mobile vehicles, immobile installations, skids, hoses, tubes, fluid tanks or reservoirs, pumps, valves, and/or other suitable structures and equipment. For example, the fluid handling system 2 may include a fluid supply 4 and pumping equipment 6, which both may be fluidically coupled with a wellbore supply conduit 8. The fluid supply 4 may contain the sealant composition. The pumping equipment 6 may be used to supply the sealant composition from the fluid supply 4, which may include tank, reservoir, connections to external fluid supplies, and/or other suitable structures and equipment. While not illustrated, the fluid supply 4 may contain one or more components of the sealant composition in separate tanks or other containers that may be mixed at any desired time. Pumping equipment 6 may be fluidically coupled with the wellbore supply conduit 8 to communicate the sealant composition into wellbore. Fluid handling system 2 may also include surface and down-hole sensors (not shown) to measure pressure, rate, temperature and/or other parameters of treatment. Fluid handling system 2 may include pump controls and/or other types of controls for starting, stopping and/or otherwise controlling pumping as well as controls for selecting and/or otherwise controlling fluids pumped during the injection treatment. An injection control system may communicate with such equipment to monitor and control the injection treatment. Fluid handling system 2 can be configured as shown in FIG. 3 or in a different manner, and may include additional or different features as appropriate. Fluid handling system 2 may be deployed via skid equipment, marine vessel deployed or may be comprised of sub-sea deployed equipment.

Figure 4:
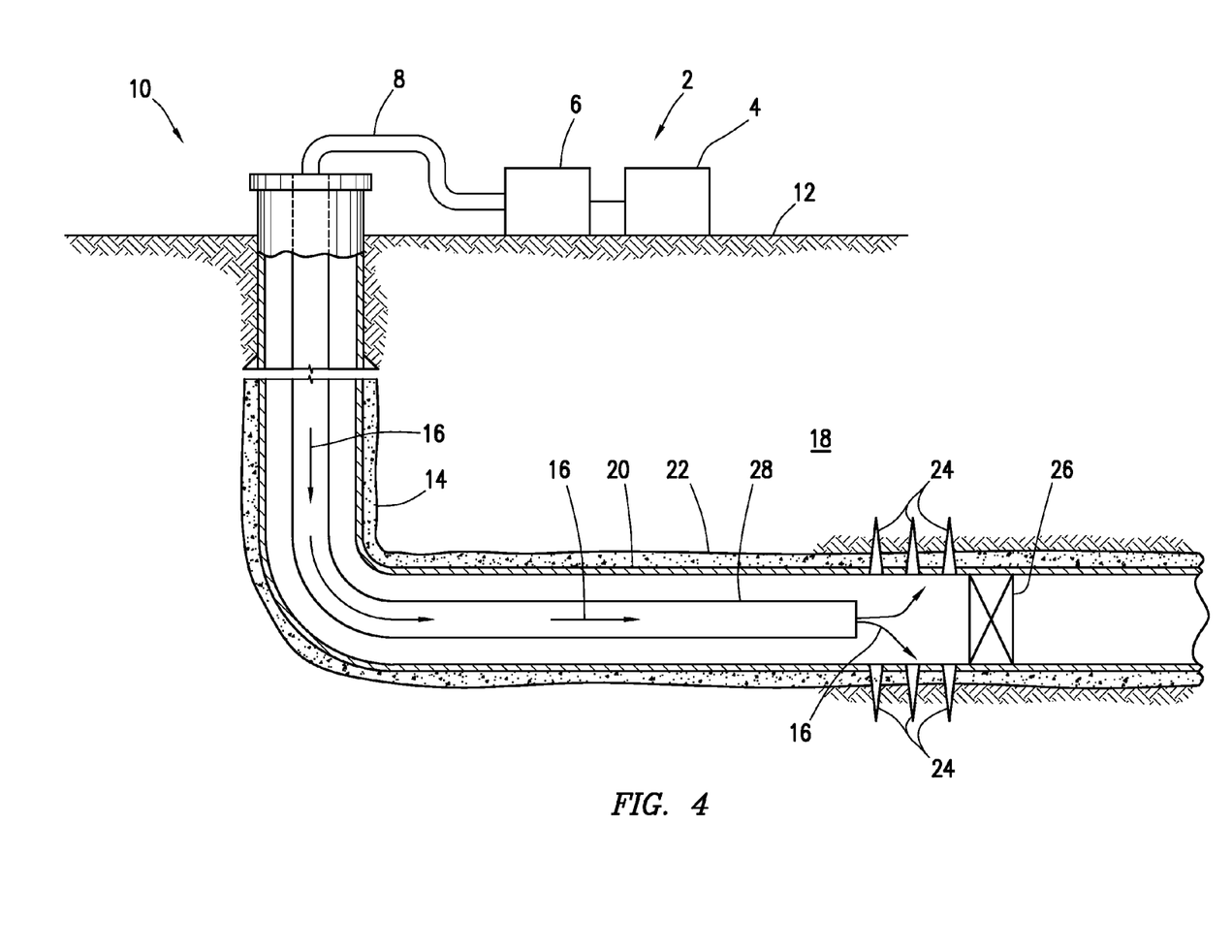
FIG. 4 is a schematic illustration of example well system showing placement of a sealant composition into a wellbore.

Turning now to FIG. 4, an example well system 10 is shown. As illustrated, the well system 10 may include a fluid handling system 2, which may include fluid supply 4, pumping equipment 6, and wellbore supply conduit 8. As previously described in connection with FIG. 3, pumping equipment 6 may be fluidically coupled with the wellbore supply conduit 8 to communicate the sealant composition into wellbore 14. As depicted in FIG. 3, the fluid supply 4 and pumping equipment 6 may be above the surface 12 while the wellbore 14 is below the surface 12. Well system 10 can be configured as shown in FIG. 4 or in a different manner, and may include additional or different features as appropriate.

As illustrated FIG. 4, the well system 10 may be used for introduction of a sealant composition 16, described herein, into subterranean formation 18 surrounding the wellbore 14. Generally, a wellbore 14 may include horizontal, vertical, slanted, curved, and other types of wellbore geometries and orientations, and the sealant composition 16 may generally be applied to subterranean formation 18 surrounding any portion of wellbore 14. As illustrated, the wellbore 14 may include a casing 20 that may be cemented (or otherwise secured) to wellbore wall by cement sheath 22. Perforations 24 can be formed in the casing 20 and cement sheath 22 to allow treatment fluids (e.g., sealant composition 16) and/or other materials to flow into and out of the subterranean formation 18. Perforations 24 can be formed using shape charges, a perforating gun, and/or other tools. A plug 26, which may be any type of plug (e.g., bridge plug, etc.) may be disposed in wellbore 14 below the perforations 24.

The sealant composition 16, which may comprise the functionalized silica nanoparticles and the crosslinkable component, may be pumped from fluid supply 4 down the interior of casing 20 in wellbore 14. As illustrated, well conduit 28 (e.g., coiled tubing, drill pipe, etc.) may be disposed in casing 20 through which the sealant composition 16 may be pumped. The well conduit 28 may be the same or different than the wellbore supply conduit 8. For example, the well conduit 28 may be an extension of the wellbore supply conduit 8 into the wellbore 14 or may be tubing or other conduit that is coupled to the wellbore supply conduit 8. The sealant composition 16 may be allowed to flow down the interior of well conduit 28, exit the well conduit 28, and finally enter subterranean formation 18 surrounding wellbore 14 by way of perforations 24 through the casing 20 and cement sheath 24. The sealant composition 16 may undergo a crosslinking reaction in the subterranean formation 18 to form a gel network that blocks certain flow paths therein, reducing the flow of fluids through the subterranean formation 18, especially the flow of aqueous fluids.

The exemplary sealant composition disclosed herein may directly or indirectly affect one or more components or pieces of equipment associated with the preparation, delivery, recapture, recycling, reuse, and/or disposal of the sealant composition. For example, the sealant composition may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the sealant composition. The sealant composition may also directly or indirectly affect any transport or delivery equipment used to convey the sealant composition to a well site or downhole such as, for example, any transport vessels, conduits, pipelines, trucks, tubulars, and/or pipes used to compositionally move the sealant composition from one location to another, any pumps, compressors, or motors (e.g., topside or downhole) used to drive the sealant composition into motion, any valves or related joints used to regulate the pressure or flow rate of the resin composition and spacer fluids (or fluids containing the same sealant composition, and any sensors (i.e., pressure and temperature), gauges, and/or combinations thereof, and the like. The disclosed sealant composition may also directly or indirectly affect the various downhole equipment and tools that may come into contact with the sealant composition such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present embodiments, the following examples of some of the preferred embodiments are given. In no way should such examples be read to limit, or to define, the scope of the disclosure.

Example 1

Figure 5:
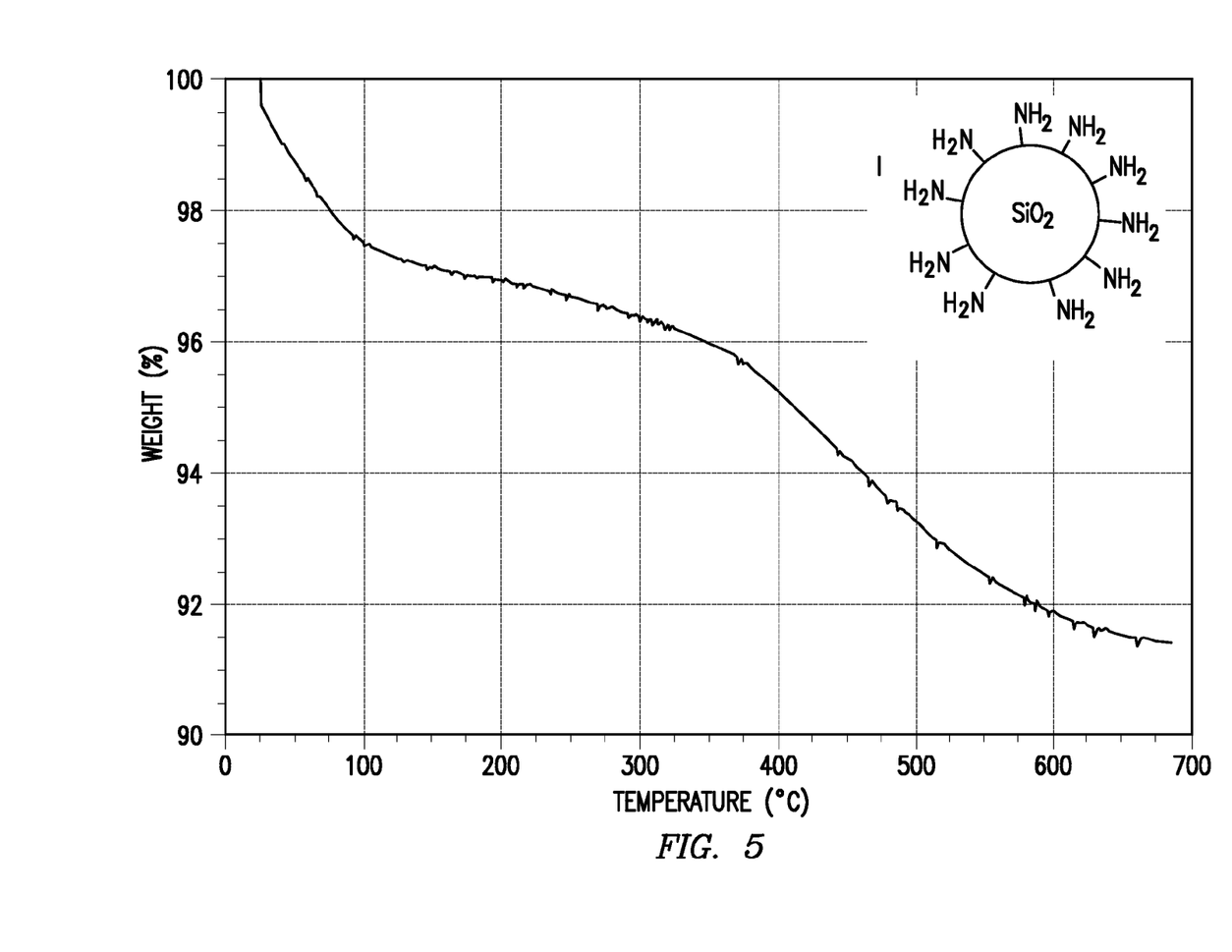
FIG. 5 is an example thermogravimetric ("TGA") curve showing weight as a function of temperature of a functionalized silica nanoparticle.

Functionalized silica nanoparticles were prepared by reacting silica nanoparticles with trimethoxysilyl propyl amine in dry toluene at 90° C. for 6 hours. The silica nanoparticles had a particle size of from 10 nanometers to 200 nanometers and were obtained from Sigma-Aldrich, St. Louis, Mo. The suspended reaction mixture was centrifuged to collect the functionalized silica nanoparticles and then dried in a round bottom flask under vacuum. Thermogravimetric analysis (TGA) of the collected nanoparticles, shown in FIG. 5, indicated that the functionalized silica nanoparticles were formed. Quantification of available amino groups on the silica nanoparticles is well known. TGA was performed using a TA analyzer from TA Instruments, Model TGA Q500.

Example 2

Figure 6:
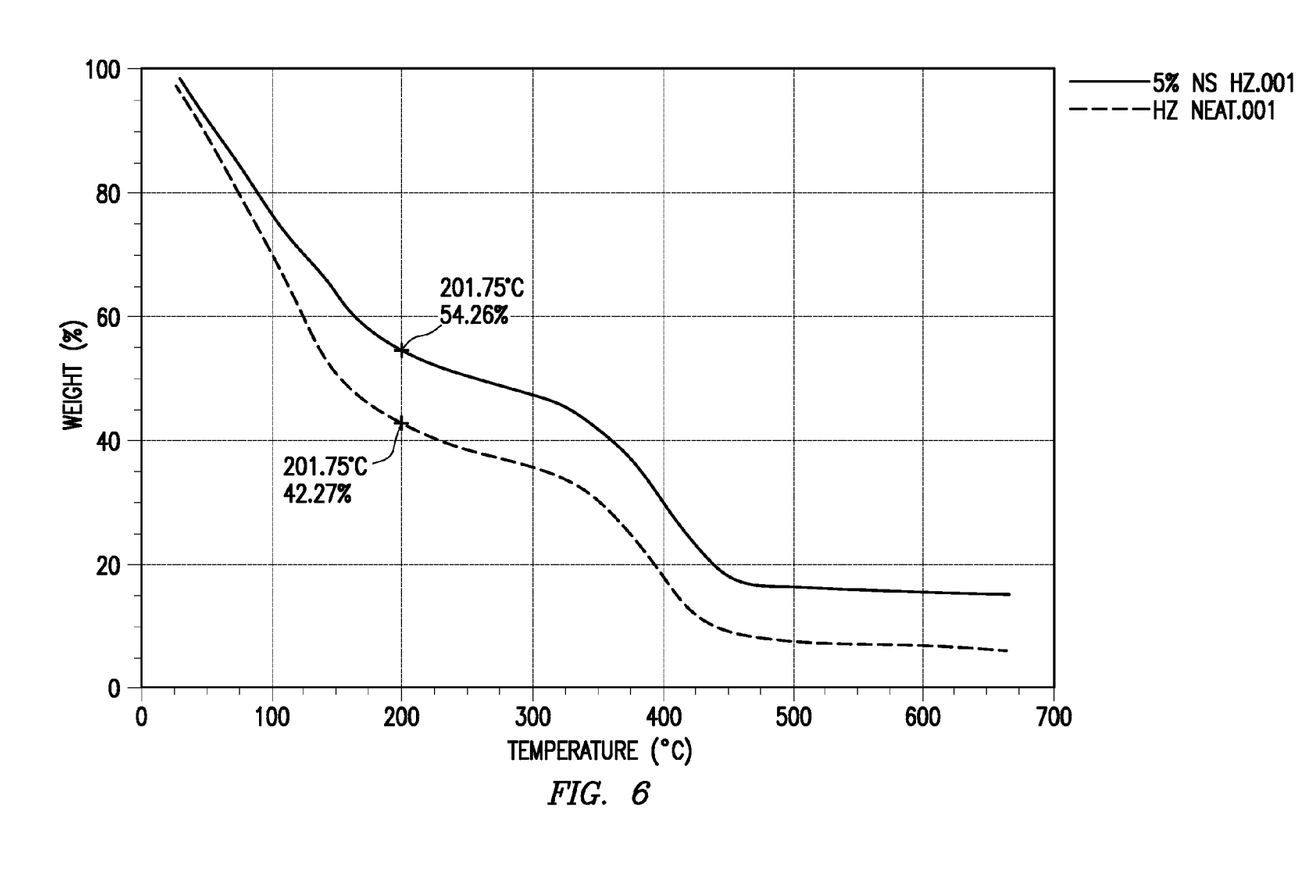
FIG. 6 are example TGA curves for cross-linked polymers with and without functionalized silica nanoparticles.

The functionalized silica nanoparticles (0.5 grams) prepared in Example 1 were mixed with 10 grams of a copolymer of polyacrylamide and an acrylate ester (20% active solution in water). The mixture was heated for 70° C. for 3 hours for crosslinking. A comparative sample was prepared by mixing 0.5 grams of a copolymer of polyacrylamide and an acrylate ester with 10 grams of polyethylene imine (20% active solution in water). TGA of the resultants gels, shown in FIG. 6, indicated that the crosslinked polymer system using the functionalized silica nanoparticles had a higher temperature stability than the comparative example. TGA was performed using a TA analyzer from TA Instruments, Model TGA Q500.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method comprising:
providing a sealant composition comprising functionalized silica nanoparticles and a crosslinkable component, wherein the crosslinkable component comprises a water-soluble polymer, the water-soluble polymer comprising N-vinylpyrrolidone;
introducing the sealant composition into a subterranean formation surrounding a wellbore; and
reacting the functionalized silica nanoparticles with the crosslinkable component in the subterranean formation such that the sealant composition forms a gel network that blocks flow paths to create a barrier in the subterranean formation surrounding the wellbore, wherein the functionalized silica nanoparticles comprise at least one functional group selected from the group consisting of amino groups, thiol groups, and combinations thereof.

2. The method of claim 1, further comprising pumping the sealant composition from a fluid supply and into the wellbore via a wellbore supply conduit fluidically coupled to the wellbore, the wellbore penetrating the subterranean formation.

3. The method of claim 1, wherein the functionalized silica nanoparticles are present in the sealant composition in an amount of from about 0.1% to about 10% by weight.

4. The method of claim 1, wherein at least a portion of the functionalized silica nanoparticles comprises the amino groups, wherein the amino groups are coupled to silica nanoparticles, the silica nanoparticles having a particle size of about 100 nanometers or less.

5. The method of claim 1, wherein the functionalized silica nanoparticles each comprise a silica nanoparticle grafted with a hyperbranched polyamine.

6. The method of claim 1, wherein at least a portion of the functionalized silica nanoparticles each comprise from about 200 to about 700 amine functionalities.

7. The method of claim 1, wherein the crosslinkable component further comprises at least one water-soluble polymer selected from the group consisting of a copolymer of a non-acidic ethylenically unsaturated polar monomer and a copolymerizable ethylenically unsaturated ester, a terpolymer or tetrapolymer of an ethylenically unsaturated polar monomer, an ethylenically unsaturated ester.

8. The method of claim 1, wherein the functionalized silica nanoparticles are used in combination with one or more additional crosslinking agents for crosslinking of the crosslinkable component.

9. The method of claim 1, wherein the barrier blocks flow paths for conformance control.

10. A well system comprising:
a sealant composition comprising a crosslinkable component and functionalized silica nanoparticles for crosslinking the crosslinkable component to form a gel network, wherein the sealant composition is disposed in flow paths in a subterranean formation surrounding a wellbore, wherein the functionalized silica nanoparticles comprise at least one functional group selected from the group consisting of amino groups, thiol groups, and combinations thereof, wherein the crosslinkable component comprises a water-soluble polymer, the water-soluble polymer comprising N-vinylpyrrolidone;
a fluid handling system for preparing the sealant composition and delivering the sealant composition into the wellbore; and
a conduit fluidically coupled to the fluid handling system and the wellbore.

11. The well system of claim 10, wherein the fluid handling system comprises a fluid supply and pumping equipment.

* * * * *